Feb. 20, 1940.  L. B. SLICHTER  2,191,120
METHOD OF GEOLOGICAL SURVEY
Filed March 2, 1935  4 Sheets-Sheet 1
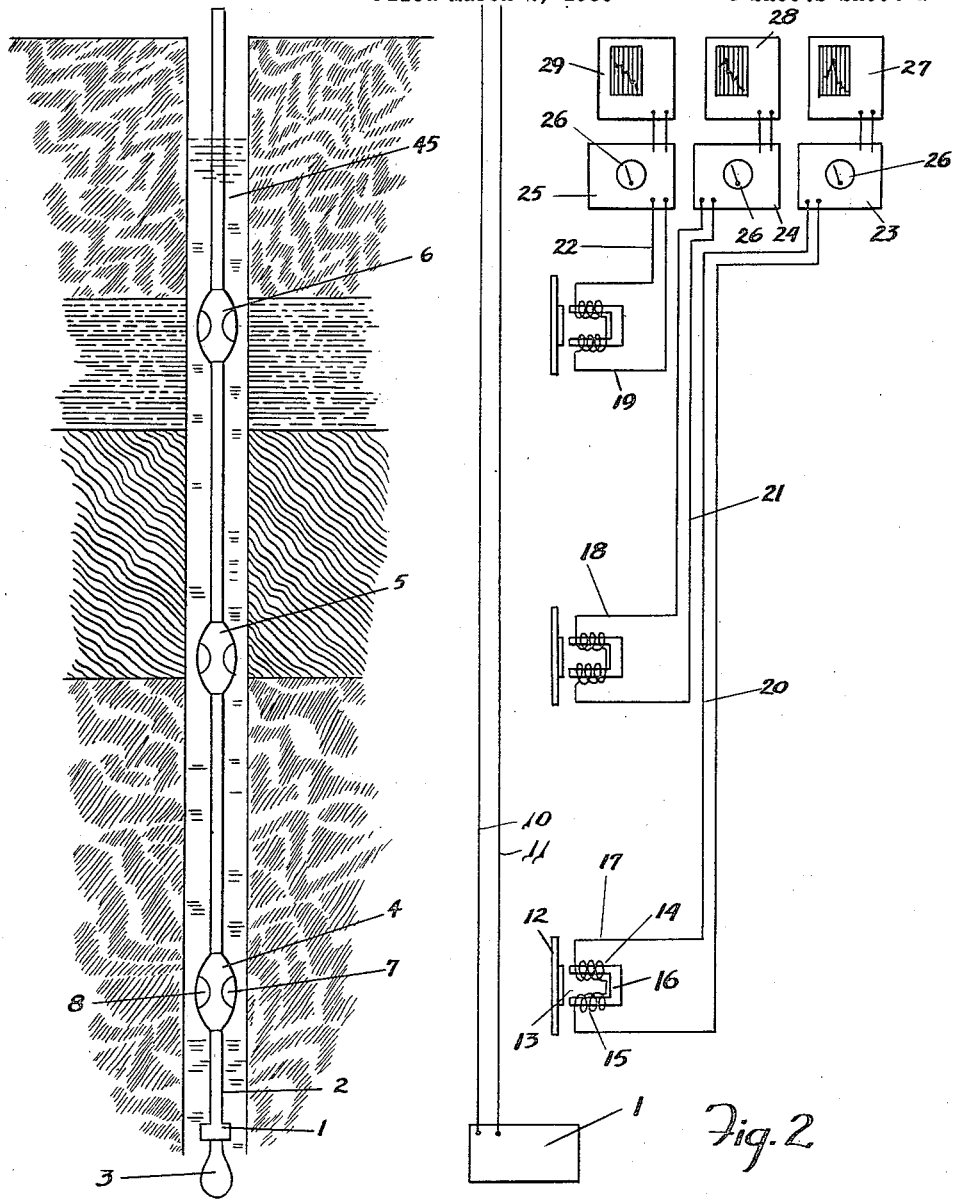
INVENTOR
Louis B. Slichter Feb. 20, 1940.   L. B. SLICHTER   2,191,120
METHOD OF GEOLOGICAL SURVEY
Filed March 2, 1935   4 Sheets-Sheet 2

INVENTOR
Louis B. Slichter

Feb. 20, 1940.   L. B. SLICHTER   2,191,120
METHOD OF GEOLOGICAL SURVEY
Filed March 2, 1935   4 Sheets-Sheet 3

INVENTOR
Louis B. Slichter

Feb. 20, 1940. L. B. SLICHTER 2,191,120
METHOD OF GEOLOGICAL SURVEY
Filed March 2, 1935 4 Sheets-Sheet 4

INVENTOR
Louis B. Slichter
BY
Hoguet, Neary & Campbell
his ATTORNEYS

Patented Feb. 20, 1940

2,191,120

UNITED STATES PATENT OFFICE 2,191,120

METHOD OF GEOLOGICAL SURVEY

Louis B. Slichter, Belmont, Mass., assignor to Schlumberger Well Surveying Corporation, Houston, Tex., a corporation of Delaware Application March 2, 1935, Serial No. 9,046

1 Claim. (Cl. 181—0.5)

The present invention relates to the exploration of drill holes and the determination of the geology of the earth thereby, particularly for the purpose of determining the properties and characteristics of the various strata that the drill hole passes through and the character of the surrounding earth. Investigations of this nature provide important information concerning the character of the ground through which drillings have been made and thereby furnish complete information for further drillings as well as information about the character and structure of the entire region where the observations are made.

In the present invention, the exploration is more particularly made by the use of compressional or other wave energy, and in particular by the use of waves of a shorter wave length than the so-called seismic vibrations, although the latter may be used in the present invention. The advantage of this type of wave over the seismic vibrations will appear more particularly from the description and discussion given below, but it may be stated briefly that by the use of shorter waves, that is, waves shorter than seismic vibrations, a greater absorption is obtained, and therefore the use of such waves provides a measuring standard that will show greater variations for the different characteristics and properties of the earth lining the drill holes at various points. It is also true that the shorter waves allow a greater number of vibrations to pass per unit of time between given spaced units and are in a given distance more affected by the character of the walls of the drill hole.

In the present invention the source of compressional vibrations of the acoustic type may be generated at any desired point in the drill hole. Such vibrations may be created either by an impulse, a discontinuous note, an explosion or by interrupted continuous harmonic vibrations or even by continuous harmonic vibrations. The source of the acoustic vibrations may be of any of the types described above and in the case of harmonic or continuous vibrations may be obtained by oscillators or sound generators such as are commonly used in the art of submarine signalling. As has been stated above the source may be placed anywhere in the drill hole and at definitely known points in the drill hole or well suitable receivers may be placed to pick up the sound energy arriving at that point from the sound source.

The intensity of the energy picked up by the receiver may be read on a suitable instrument or the value of the intensity may be recorded. The relative response of the various receivers may also be compared; for instance, by introducing resistance of known magnitude in a known response circuit sufficient to reduce the response to a standard level of comparison or by thermocouple measurements with or without amplification. The energy received by a single receiver relative to the source energy may also be measured by well known means. The invention, the operation of the same, and the principles involved, will be more readily understood by consideration of the following description taken in connection with the drawings, in which:

Figure 1 shows the invention as applied to the drill hole.

Figure 2 shows schematically a wiring diagram for connecting the various units.

Figure 3:
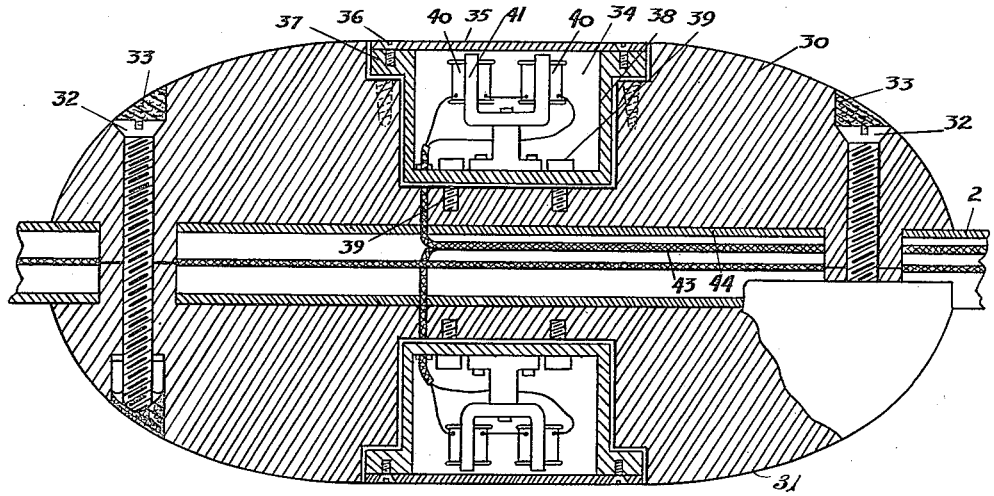
Figure 3 shows a detail of the receiving units as attached to the cable in the drill hole.

In Figure 1, a sound generator or oscillator 1 may be provided towards the lower part of the well, or as has been stated above, in any other desired position. The generator 1 may be supplied by energy transmitted through the cable 2, which cable may also act as a support for the generator 1. The generator 1 may be of any suitable type and preferably is of the so-called oscillator type used generally for sub-aqueous signalling. The generator 1 may act as a weight for the cable, or additional weight may be provided as shown by the weight 3 attached thereto. At various points along the cable 2, there are provided receiving units 4, 5 and 6, there being three shown in Figure 1, but it is understood that one or more units may be used if desired, and that two units may suffice. These units are individually connected through conductors forming a part of the cable. A pair of conductors may be used for each unit or in fact a single conductor may be used with a ground or with common wire return.

Figure 4:
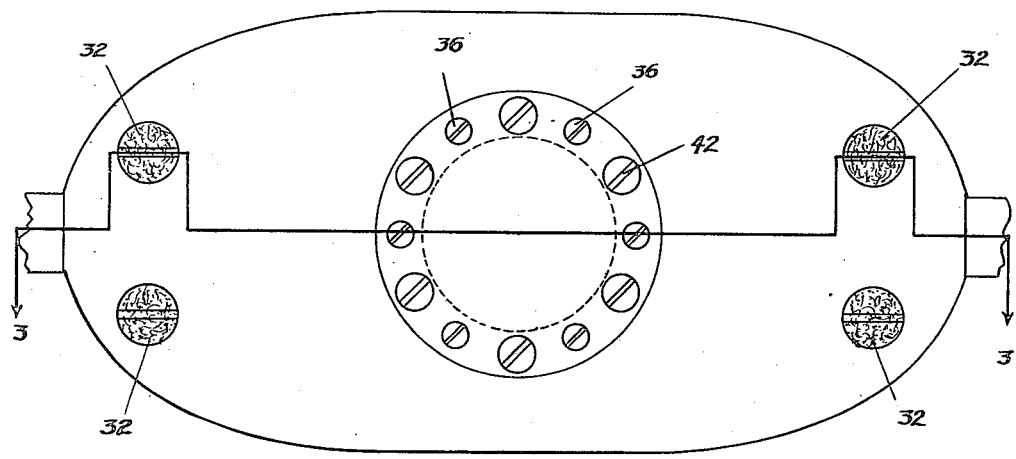
Figure 4 shows the same detail as Figure 3, but viewed from the top.

Each receiving unit, 4, 5 and 6 may be provided with two separate receivers, if desired, as indicated by 7 and 8, the receiving unit itself may be made streamline as shown in Figures 3 and 4, which will be described later.

Figure 6:
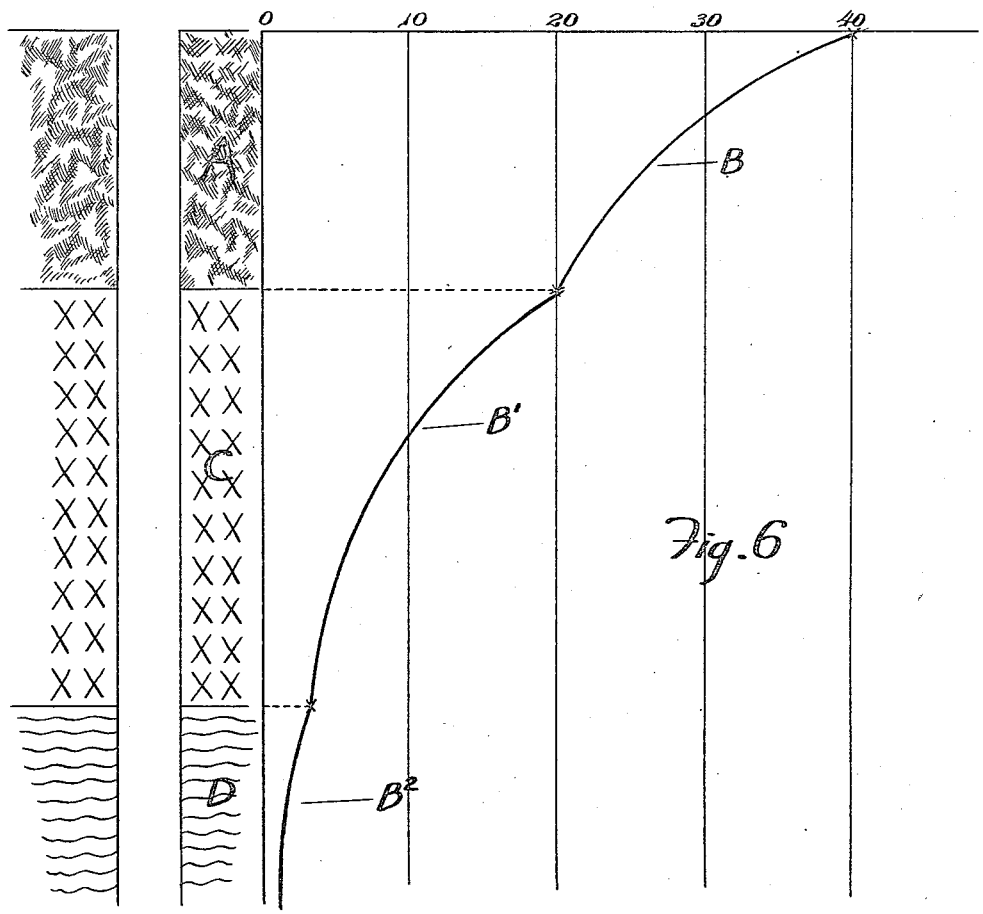
Figure 6 shows an intensity curve indicating the change of character of the surface walls of the well or hole.

In Figure 2 there is shown diagrammatic representation of the system set forth in Figure 1. In this case an oscillator 1 is supplied by energy through the conductors 10 and 11 which may be twisted and shielded to prevent induction or disturbances of the receiving conductors which also may be twisted and shielded within the cable 2. The units 7 and 8 may be of the magnetophone type, as indicated in Figure 2, in which the diaphragm 12 has an armature 13 inducing current in the windings 14 and 15 placed over the core 16. Each unit, such as 17, 18 and 19 is connected respectively by the conductors 20, 21 and 22 to its respective amplifier and indicator 23, 24 and 25, in which an indicating meter such as 26 may be provided. Any other suitable means may be used such as a bridge with a phone or galvanometer. If desired each unit 23, 24 and 25 may be respectively connected to recorders 27, 28 and 29, so that a permanent record can be kept of the intensity of the signal received at each receiver, or preferably of the relative intensities of the signals received at each receiver. These intensities may be plotted as ordinates on a curve such as is shown in Figure 6, the abscissae corresponding to the points at which the receivers are placed in the drill holes.

In Figure 3 there is shown in greater detail the structures of the units 4, 5 and 6. Such units each comprises a streamline case made of two parts 30 and 31 which are somewhat oval in shape, and have, when put together a center opening or hole through which the cable 2 may pass. The two parts 30 and 31 which may be made of wood or other suitable material are held together in any suitable manner, as for instance by machine or wood bolts or nuts 32, 32, 32, 32, which as indicated in Figure 3 may be recessed in one half of the frame and covered by a cement filling as indicated by 33, 33. When the half units are applied to the cable, the cable is firmly clamped within the unit and the unit gives an appearance somewhat of the shape of a football, the two parts being firmly held together by the clamping bolts. Each half unit 30 and 31 may be provided with a suitable receiver, as for instance a receiver 34 of the magnetophone type in which there is provided a diaphragm 35 held fast by bolts 36 to a flange 37 of the casing 38 of the magnetophone. The casing 38 may be held in the unit 30 by means of the bolts 39, a recess being formed within the unit 30 so that the casing will fit snugly into it. Within the casing 38 there may be provided two coils 40, forming with the U shaped core 41, a magnet system which will set up or generate a current when the diaphragm 35 vibrates. The coils 40 may be polarized with direct current, or permanent magnets may be used. The diaphragm 35 may be made flush with the surface of the half 30, which unit itself is substantially streamlined about the conductor. The cable 2 may contain a supporting core to support the weight of the cable itself and the receivers that are down deeper in the drill hole, and similarly the cable 2 may be provided with groups of twisted leads for the various receiving units. The half 30 and the half 31 may both be provided with sound receivers and while these may be individually connected with their indicators and recorders, nevertheless, it is preferable to operate both receivers in parallel or series and place them as indicated in Figure 1, on either side of the streamline unit.

The receivers themselves may be held in the units by means of screw or machine bolts 42 and the leads to transmit the energy picked up by the vibrations of the diaphragm 35 may be connected to the cable 43 passing through the casing 38 and through the outer cable shield 44 of the cable itself.

Figure 5:
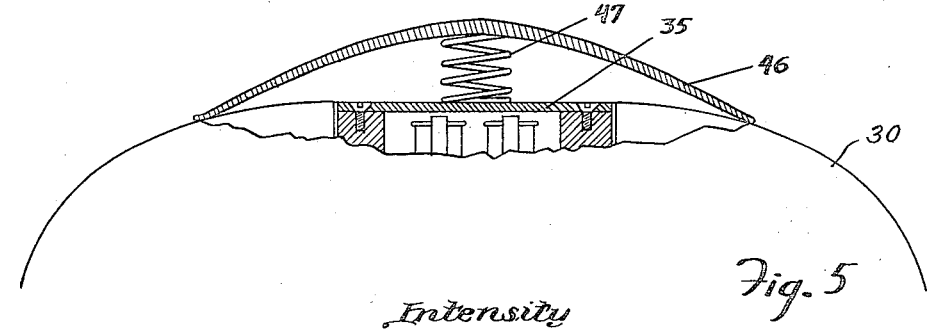
Figure 5 shows a further modification for application to so-called dry wells.

A great part of the exploration is to be done in drill holes that are filled with water as indicated by 45 in Figure 1. In this case the water serves as the chief propagating medium for the transmission of the compressional waves in the well. However the analogous procedure may be utilized in a dry hole. In this case the source communicates its vibrations to the air, and the receivers receive energy from the air. Furthermore, instead of transmitting the energy through the air in the hole or through water in the hole, the energy might be transmitted through the walls of the hole by impressing the vibrations upon the wall of the hole and receiving them from the walls of the hole. For this purpose a contacting cap or convex plate 46, as indicated in Figure 5 may be provided, which element may be somewhat resilient and be supported against the diaphragm 35 by means of a spring support 47 or in any other suitable manner. The spring 47 may be held in any way to the resilient cap 46 and the diaphragm 35 such as by welding or by some mechanical attachment. The cap 46 should be made of sufficient height so that as the receiver is lowered down into the drill hole, the cap 46 will press against the side walls of the drill hole and make a good acoustic connection between the walls of the drill hole and the diaphragm 35. By providing caps to both diaphragms sound energy may be picked up quickly on both. In the operation of the system it should be noted that while the sound waves may travel uniformly through the water in the drill holes, nevertheless, due to the character of the sides of the hole, the observation of the sound travelling down the sides of the hole, will vary, dependent to a great extent upon the character or porosity of the earth at the sides of the hole. The observation of the sound energy at a given distance down in the hole depends upon the character of the sound energy, particularly the frequency and ultimately upon the porosity of the material forming the walls of the hole. The porosity of the wall rock of a drill hole is of importance practically in the determination of the flow of oil from the oil rock or sand or the flow of water into the hole and may be measured by the comparative or absolute intensities of the sound waves picked up by the various receiving units. Since the absorption per unit length will be greater at the audible frequencies than in the range of subaudible frequencies or seismic vibrations, it will readily be seen that the use of audible vibrations has a distinct advantage in the present invention. This is particularly true where there is good transmission in the drill hole, because the absorption is small and more difficult to measure. It may be noted in this respect that the absorption will change with the change in the structural character of the walls of the hole, and that the intensity curve follows a law of decay as a function of distance which will change with the change of the strata or layers in the earth. This is indicated in Figure 6, where for the strata A, the intensity curve is represented by B, and for the strata C, represented by $B^1$, while for the strata D, it is represented by $B_2$, a point of inflection occurring where the stratum changes. Where the well is dry, the modification shown in Figure 5 may be used, in which case the cap 46 is placed against the side of the drill hole through the spring 47 and the sound energy is conveyed to the receiver by the contact of the plate 46, the spring 47 operating against the diaphragm 35. Other means may be provided for acoustically coupling the side of the drill holes with the receiver, but in each case it should be remembered that the units must not be held so tightly against the side walls of the drill hole that the cable cannot be lowered. Observations may be taken with the cable part way or all the way down in the drill hole. It is preferable in making such observations to keep the distance of the receiving units at a constant spacing one from the other and from the source, and this is possible by clamping the units as indicated in Figure 1, directly to the cable itself.

Figure 7:
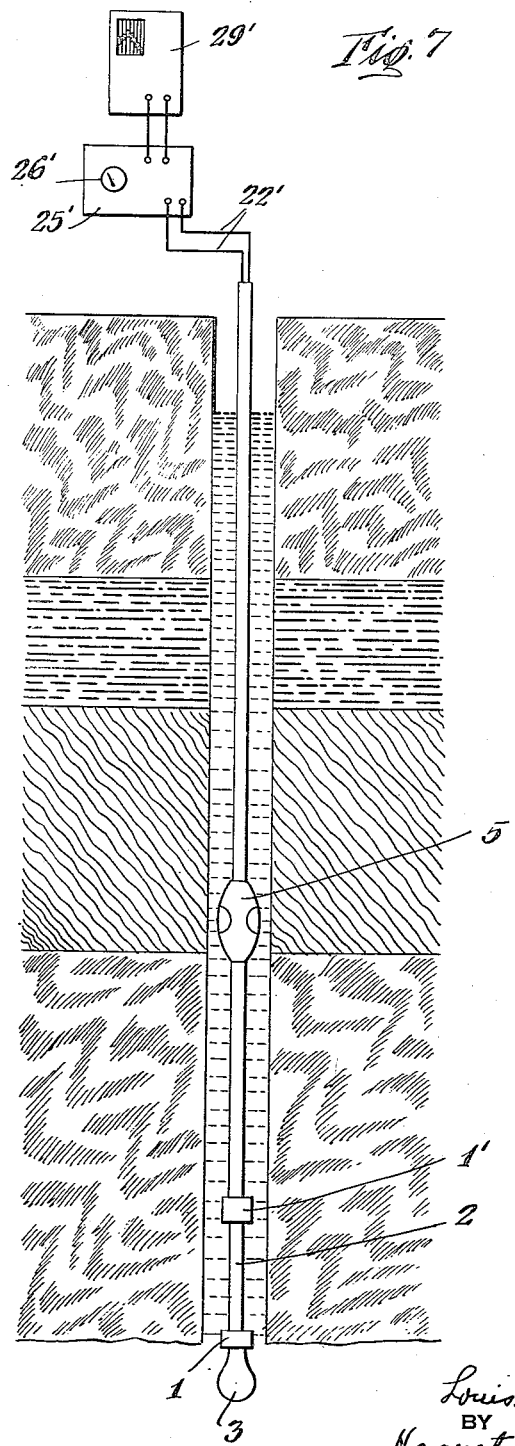
Fig. 7 illustrates a modification involving a single receiver and a plurality of transmitters.

In place of using a single transmitter and a plurality of receivers, a single receiver and a plurality of transmitters may be used. In the latter case, the transmitters 1 and 1' may be placed at definite points in the hole or well as shown in Fig. 7, and operated successively, and the energy picked up by the receiver 5 in the bore hole. The responses of the receiver 5 may be transmitted through the conductors 22' to the amplifier 25' and its indicating meter 26' and recorder 29' and the absolute or relative intensities of the energy received from each transmitter may be measured or compared.

Continuous measurement may be made with a recorder or otherwise as the source and receivers are moved as a unit along the hole, and in this way a complete survey of the hole may be made obtaining measures of intensity or response of the receivers at all points in the hole, thus establishing a curve of absorption for all depths in the hole.

It is understood that the frequency of the source may be varied to secure a degree of absorption suitable to the particular conditions encountered. If the absorption is too high, the frequency may be lowered and vice versa.

Having now described my invention, I claim:

A method of determining the geological structure of the earth in the vicinity of a drill hole which comprises successively producing sound vibrations at spaced points in the drill hole, receiving at a single fixed position from said spaced points therein the waves produced at said points and comparing the energy received from said points.

LOUIS B. SLICHTER.